Patented Apr. 13, 1948

2,439,626

UNITED STATES PATENT OFFICE 2,439,626

ANTHRAQUINONE VAT DYESTUFFS

Walter Kern, Sissach, Switzerland, assignor to Society of Chemical Industry in Basle, Basel, Switzerland, a Swiss firm No Drawing. Application October 2, 1944, Serial No. 556,908. In Switzerland November 1, 1943

4 Claims. (Cl. 260—372)

According to this invention valuable vat dyestuffs are prepared by introducing an acylamino group into each of the 1- and 4-positions of an anthraquinone, at least one of the said acylamino groups containing the radical of an arylsulfone-aryl carboxylic acid as acyl radical.

Anthraquinones serving as starting materials for the present process may contain, for example, also such substituents as are usual in vat dyestuffs of this kind, e. g. halogens.

The arylsulfone-aroylamino groups which are to be introduced into such compounds may contain as aryl radicals for example radicals of the benzene series. In the arylsulfone-arylcarboxylic acids from which they are derived the carboxyl group may occupy various positions with respect to the arylsulfone group, for example, the meta-position and preferably the para-position. Examples of such carboxylic acids are 3-phenylsulfone-benzene-1-carboxylic acid and 4-phenylsulfone-benzene-1-carboxylic acid.

The arylsulfone-aroylamino groups can be introduced into the above mentioned vattable compounds in several stages, for example by introducing at first amino groups into the positions 1 and 4 of an anthraquinone nucleus (for example by nitrating and reducing or by sulfonating and reacting with ammonia) and then acylating these amino groups with arylsulfone-aryl-carboxylic acids. For example, 1:4-diaminoanthraquinone can be reacted with 2 mols. of 4-phenylsulfone-benzene-1-carboxylic acid chloride. In many cases it is also possible to introduce arylsulfone-aroylamino groups in one stage, by exchanging for example a substituent capable of being exchanged, such as halogen or nitro groups, for arylsulfone-aroylamino groups by treating with arylsulfone-aryl-carboxylic acid amides.

According to the present process preferably only one arylsulfone-aroylamino group is introduced into an anthraquinone nucleus, whereas the para-position to this group is occupied, for example previously or subsequently, by an acylamino group the acyl radical of which corresponds to a carboxylic acid free from sulfone groups, e. g. to an aromatic carboxylic acid, such as benzoic acid. For example 1-amino-4-benzoylaminoanthraquinone can be caused to react with 1 mol. of 4-phenylsulfone-benzene-1-carboxylic acid chloride or e. g. 1-halogen-4-benzoylaminoanthraquinones can be reacted with 1 mol. of the corresponding acid amide.

The products thus obtained can be used in known manner for dyeing and printing a great variety of animal and, especially, vegetable fibers, such as cotton, linen, artificial silk, and staple fiber from regenerated cellulose and superpolyamides. Furthermore, in the form of their leucoester salts of sulfuric acid obtainable in the usual manner they can be used for dyeing and printing by the usual methods employed for this class of dyestuffs.

The following examples illustrate the invention, but are not to be regarded as limiting it in any way, the parts being by weight:

Example 1

13 parts of 4-phenylsulfone-benzene-1-carboxylic acid are suspended in 320 parts of anhydrous ortho-dichlorobenzene and after adding 40 parts of thionyl chloride and a small quantity of pyridine, the mixture is maintained first for 1 hour at 80–90° C. and then for a further hour at 100–110° C., while stirring. The thionylchloride in excess and some ortho-dichlorobenzene are distilled off and the temperature is reduced to 100° C., 17.25 parts of 1-amino-4-benzoylaminoanthraquinone are added and stirring is continued for 2 hours at 170–175° C., finally for ¼ hour at the boil. When cold the precipitated 1-(4'-phenylsulfone - benzoylamino)-4-benzoylaminoanthraquinone is filtered off, washed with alcohol and dried. The dyestuff obtained in very good yield forms red crystals melting at 363–365° C. which dissolve in concentrated sulfuric acid to a red solution and dye cotton very fast, brilliant red tints from a black-violet vat.

A similar dyestuff is obtained by using 3-phenylsulfone-benzene-1-carboxylic acid, instead of 4-phenylsulfone-benzene-1-carboxylic acid. Bluer shades are obtained by reacting 1-amino-4-benzoylaminoanthraquinone with 4-(4'-chlorophenylsulfone)-benzene-1-carboxylic acid or 4-(4'-methoxy - phenylsulfone)-benzene-1-carboxylic acid.

In all the dyestuffs of this example the benzoylamino group in 4-position of the anthraquinone nucleus may be replaced by substituted benzoylamino groups, such as groups containing the radical of 3- or 4-chlorobenzoic acid, anisic acid or para-toluic acid. Very similar results are also obtained with dyestuffs containing halogen in the anthraquinone nucleus, for example chlorine in 6-position.

Example 2

2.6 parts of 4-phenylsulfone-benzene-1-carboxylic acid are suspended in 65 parts of anhydrous ortho-dichlorobenzene and after adding 8 parts of thionylchloride the mixture is maintained first for 1 hour at 80–90° C. and then for a further hour at 100–110° C., while stirring, whereby solution occurs. The thionylchloride in excess and some parts of ortho-dichlorobenzene are distilled off, the temperature is reduced to 100° C. and 1.2 parts of 1:4-diaminoanthraquinone are introduced. In order to complete the reaction, stirring is continued for 2 hours at 170–175° C. and for ¼ hour at the boil, whereupon the dyestuff, after cooling, is precipitated as red needles. These are filtered, washed with alcohol and dried. The 1:4-di-(4'-phenylsulfone-benzoylamino)-anthraquinone which is obtained in very good yield is dissolved in concentrated sulfuric acid to a red-orange solution and dyes cotton fast red tints from a green vat.

A similar dyestuff is obtained if 1:4-diaminoanthraquinone is condensed with 4-(4'-chlorophenylsulfone)-benzene-1-carboxylic acid.

*Example 3*

2 parts of the dyestuff obtained according to the first paragraph of Example 1 are thoroughly stirred with 300 parts of water and 8 parts by volume of caustic soda solution of 36° Bé. and the solution is vatted by addition of 4 parts of sodium hydrosulfite at about 30° C. This stock vat is added to a dye-bath containing in 2700 parts of water 7 parts by volume of caustic soda solution of 36° Bé. and 4 parts of sodium hydrosulfite. 100 parts of cotton are introduced into the dye-bath at 25° C., 75 parts of common salt are added after ¼ hour and dyeing is continued for 1 hour at 25–30° C. The cotton is squeezed, oxidized in the air, rinsed, acidified, rinsed again and soaped at the boil. The goods are dyed very fast red tints.

What I claim is:

1. A vat dyestuff which is an anthraquinone substitution product of the formula

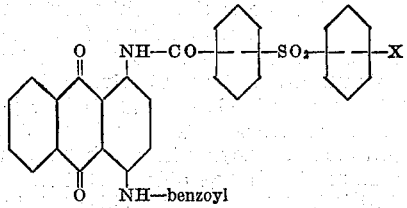

wherein X stands for a member selected from the group consisting of hydrogen, chlorine and methoxy.

2. A vat dyestuff which is the anthraquinone substitution product of the formula

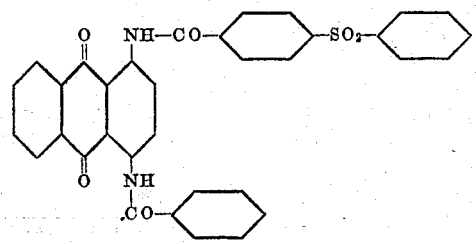

3. A vat dyestuff which is the anthraquinone substitution product of the formula

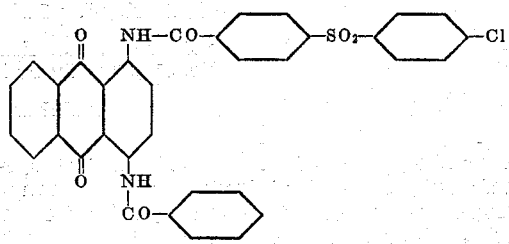

4. A vat dyestuff which is the anthraquinone substitution product of the formula

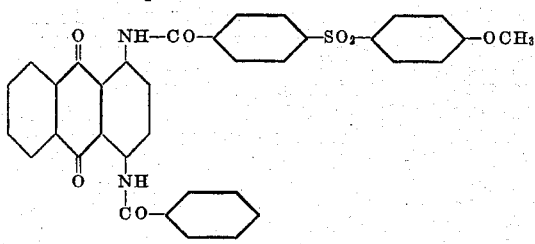

WALTER KERN.

REFERENCES CITED

The following references are of record in the file of this patent:

UNITED STATES PATENTS

| Number | Name | Date |
|---|---|---|
| 2,190,751 | Zerweck et al. | Feb. 20, 1940 |
| 2,356,061 | Irving et al. | Aug. 15, 1944 |

FOREIGN PATENTS

| Number | Country | Date |
|---|---|---|
| 656,488 | Germany | Feb. 11, 1938 |